United States Patent [19]

Belz et al.

[11] 3,957,643

[45] May 18, 1976

[54] CENTRIFUGAL MOISTURE EXTRACTOR

[76] Inventors: Frederick W. Belz, 3824 Gordon Ave.; Albert B. Crabb, Jr., 2421 8th Ave., both of Fort Worth, Tex. 76110

[22] Filed: Aug. 12, 1974

[21] Appl. No.: 496,570

[52] U.S. Cl. .................. 210/149; 210/249; 210/361

[51] Int. Cl.² .................. B01D 33/06

[58] Field of Search .................. 34/8, 57 R, 57 D, 58; 210/78, 210, 249, 360 R, 361, 394, 149; 233/1 R, 1 C, 10–13, 23 A

[56] References Cited

UNITED STATES PATENTS

| | | | |
|---|---|---|---|
| 2,733,855 | 2/1956 | McCoy | 210/360 R |
| 2,787,841 | 4/1957 | Warino | 34/58 |
| 3,080,061 | 3/1963 | Forsberg | 210/249 |
| 3,688,906 | 9/1972 | Ferrara | 210/360 R X |
| 3,731,394 | 5/1973 | Onishi | 210/360 R |
| 3,824,701 | 7/1974 | Norquist | 210/360 R X |

FOREIGN PATENTS OR APPLICATIONS

| | | | |
|---|---|---|---|
| 1,091,328 | 4/1955 | France | 34/58 |

*Primary Examiner*—Charles N. Hart
*Assistant Examiner*—Robert H. Spitzer
*Attorney, Agent, or Firm*—Peter J. Murphy

[57] ABSTRACT

An extractor unit of relatively small size includes a motor-basket assembly consisting of an electric motor with suitable protective housing and a projecting drive shaft, and an open ended, generally cylindrical basket nonrotatably coupled to the drive shaft in axial relation. This motor-basket assembly is freely suspended from one or more overhead members of a support frame by one or more suspension links which are elastic and flexible, with such links being secured to the motor housing. The point of attachment to the motor housing in relation to the center of mass of the motor-basket assembly will determine whether the assembly is supported horizontally, vertically or otherwise. The unit is enclosed in a protective housing which, in one form, closely encloses the motor-basket assembly and defines a part of the assembly suspended by the frame; and, in another form, is secured to the frame enclosing the entire unit including the frame and the suspended motor-basket assembly. In either case the housing defines a loading port in alignment with the basket open end.

20 Claims, 11 Drawing Figures

CENTRIFUGAL MOISTURE EXTRACTOR

BACKGROUND AND SUMMARY OF THE INVENTION

This invention relates to a centrifugal extractor for removing water or other liquids from small articles such as wigs and light clothing; and more particularly to such a unit which is of light weight and easily portable.

While centrifugal extractors for removing water or other liquids from articles are well known in the art, such units are usually quite heavy and bulky, consisting of a relatively heavy enclosing housing to be supported on a floor surface, and within which is rotatably supported a basket or drum. In use, the rotating basket is normally out of balance relative to its axis of rotation, because of the load placed therein; and, depending upon the load and upon the speed of rotation of the basket, considerable vibration is set up. The rotating basket and associated driving means are mounted within the housing in a manner to permit vibrational movement of the basket and assembly relative to the housing, and also in a manner to absorb the vibrations. In spite of such absorptive mountings, the vibrations of the basket will tend to produce movement of the entire unit along the supporting surface; and it is for this reason that the housings and associated structure are massive and heavy.

With the increase in use of wigs and other hair pieces, manufactured from both natural and synthetic fibers, and with the increasing and popular use of clothing such as blouses, lingerie, etc. manufactured from synthetic fibers, it is desirable to provide a centrifugal extractor of suitable construction, with respect to manufacturing cost and weight, to be portable and convenient for use in the home as well as in commercial establishments. Particularly, with respect to wigs, hair pieces or articles of clothing which are manufactured from synthetic fibers, such articles can be dried almost completely in a centrifuge within a very short time since, as is well known, moisture is not absorbed by such fibers but is merely retained on the surface. Accordingly such articles may be washed and dried within a very few minutes, if a suitable centrifugal extractor is readily available.

A principal object of this invention is to provide a centrifugal extractor for the drying of wigs and other small articles, which is light weight and portable and therefore capable of being stored in an out of the way place yet is readily available for immediate removal and use.

Another principal object of this invention is to provide a centrifugal extractor having a unique suspension for the motor-basket assembly such that a massive support structure or housing is not required.

These objects are accomplished in a centrifugal extractor which includes an assembly comprising an electric drive motor, having a motor housing and a drive shaft projecting therefrom, and an open ended extractor basket rigidly and nonrotatably coupled to the motor shaft with its open end facing away from the motor. A support frame is provided for this assembly; and the assembly is suspended from the frame by at least one elastic, flexible suspension link connected between the frame and the motor housing. The motor-basket assembly is enclosed by a housing means having a loading port, with this housing means and assembly being disposed relative to each other to position the basket open end adjacent to the loading port.

More particularly, in one general form a light weight shell-like housing is firmly fixed to the motor-housing and relatively closely encloses the motor-basket assembly, with the assembly of motor, basket and shell housing being supported as a unitary assembly from the support frame. In another broad form of light weight shell-like housing encloses the support frame and suspended motor-basket assembly, with the housing being firmly attached to the support frame.

The novel features and the advantages of the invention, as well as additional objects thereof, will be understood more fully from the following description when read in connection with the accompanying drawings.

DRAWINGS

DESCRIPTION OF THE PREFERRED EMBODIMENTS

Figure 2:
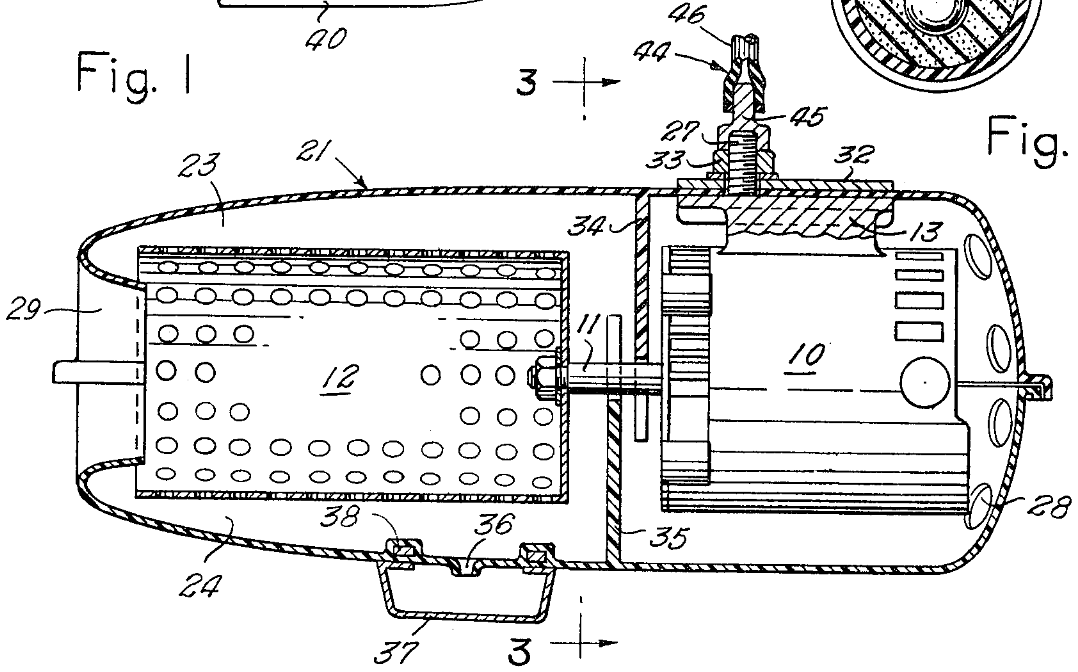
FIG. 2 is a longitudinal sectional view of the unit of FIG. 1, omitting the support frame.

In the following specification there are described several different embodiments of centrifugal extractor units according to the invention. Each centrifugal extractor unit includes a motor-basket assembly which consists of an electric motor including a protective housing 10, having a projecting drive shaft 11 to which is attached a cup-shaped basket 12, as best seen in FIG. 2. In the illustrated form, the basket 12 is an elongated cylindrical basket fabricated of any suitable material with perforated side walls, and with its base having an aperture to receive the threaded end of the drive shaft 11. The basket is rigidly and non-rotatably secured to the shaft by means of a lock nut, with the rotational axis of the basket corresponding to that of the shaft.

In the several extractor units to be described this motor-basket assembly 10, 12 represents the principal weight of the unit; and this assembly is supported by means of suitable brackets secured to the motor housing.

As an example of specifications for a motor-basket assembly, as illustrated in FIG. 2 the basket may be fabricated of aluminum having a diameter of 5 inches and a length of 9 inches. The motor may be a 1/5 hp motor, for example driving the shaft and basket at 3450 rpm. This same motor-basket assembly 10, 12 will be referred to in connection with each described unit; however, different forms of support brackets associated with the motor housing will be described.

Figure 5:
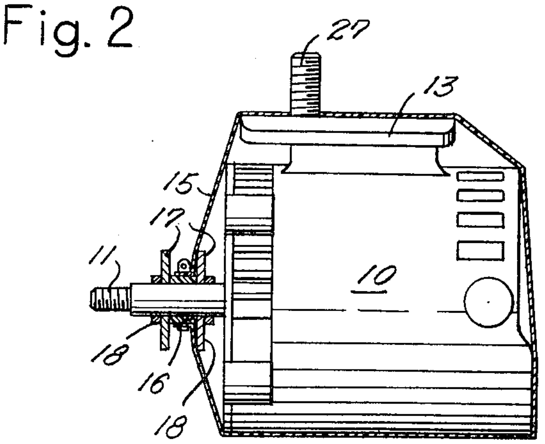
FIG. 5 is a detail view, illustrating an alternative form of motor protection, for the unit of FIGS. 1 and 2, the motor being encased in plastic film.

FIG. 5 of the drawing illustrates the same motor 10 for this assembly and illustrates one means for protecting the motor from moisture. Referring to FIG. 5, the motor 10 and attached support bracket 13 are enclosed in an envelope or bag 15 fabricated from a water proof plastic film material, such as polyvinyl chloride, referring to as a shrink plastic. As illustrated, the open end of the bat 15 is bunched and secured to a bushing 16, rotatable on the shaft 11, by means of a suitable clamp. The bushing is axially confined on the shaft by means of contiguous washers 17, and adjacent annular seals 18 fabricated of nylon for example. The outer washer 17 may be fabricated of a fibrous material, for example, and function as a sling washer. The shrink plastic is so described since, when subjected to heat in the range of 220° to 250° F. for example, it will shrink to provide a tight envelope enclosing the motor and fully protecting the motor from moisture.

A motor designed to operate continuously at 158°F. was tested with this type of moisture protection. The test consisted of operating the motor intermittently for running periods of 27 seconds and off periods of 53 seconds; and, when operated in this manner for over 500 running cycles, it was observed that the motor temperature only exceeded the ambient temperature of 75° F. by 30°. It would be desirable, with this type of moisture seal, to equip the motor with a thermostatic cutoff to prevent overheating.

The above described sealed motor may be used in any of the following embodiments. In one embodiment to be described, the baffles are described as an alternative means for protecting the motor from moisture; and it will be understood that a suitable form of motor protection may be provided in each embodiment.

EMBODIMENT OF FIGS. 1 THROUGH 3

Figure 1:
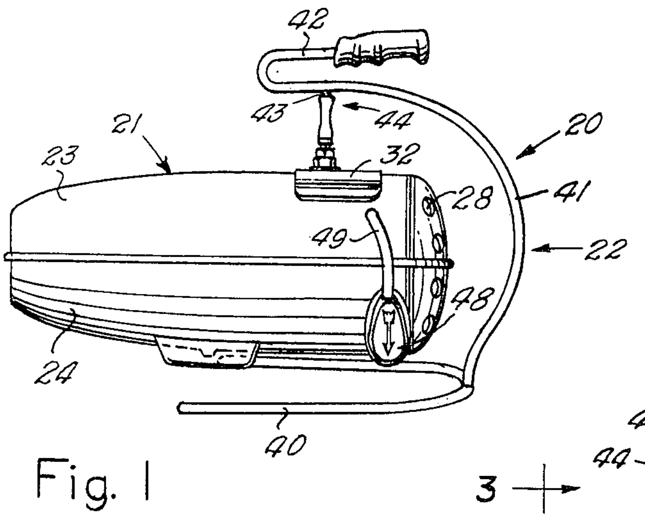
FIG. 1 is an elevation view of one form of extractor unit according to the invention, including an external support frame.
Figure 3:
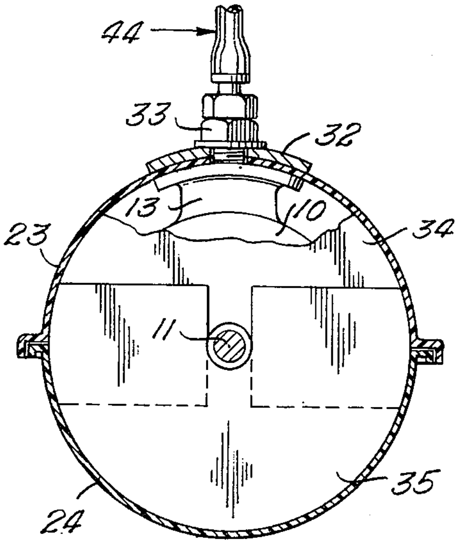
FIG. 3 is a transverse sectional view in plane 3—3 of FIG. 2.

FIGS. 1, 2 and 3 illustrate one form of centrifugal extractor unit 20 consisting of the above described motor-basket assembly enclosed within a relatively close fitting housing 23, 24 and suspended from a support frame 22. For supporting the motor-basket assembly, the bracket 13, rigidly secured to the motor housing 10, includes bracket plate having an external cylindrical surface generally concentric with the motor axis. A threaded stud 27, secured to the bracket plate by welding for example, projects radially from the plate and is positioned relative to the motor-basket assembly to suspend this assembly at its axial center of mass.

The housing is in the form of a shell, fabricated from a thin walled plastic which may be vacuum formed from a material known as ABS (acrylonitrle butadiene styrene) and consists of upper and lower members 23 and 24 having coacting flanges joined in a horizontal axial plane by means of suitable cement for example, The housing is generally cylindrical and elongated in shape, providing a pleasing appearance, being closed at the motor end which is provided with vent holes 28 and providing a loading part 29 at the other end communicating with the open end of the basket 12. The housing if firmly attached to the motor-basket assembly at the bracket plate 13, the shell and bracket plate having corresponding cylindrical contours, and the upper shell member 23 is provided with an opening to accommodate the stud 27. The housing member is clamped to the bracket plate 13 by an arcuate clamping plate 32 secured by a lock nut 33 threaded onto the stud 27.

The housing members may be vacuum formed to a thickness of 1/10 inch for example and, when assembled to the motor-basket assembly and secured together, define a relatively rigid enclosure firmly attached as above described to the assembly. The housing is preferably designed to provide a pleasing appearance, and provides the additional functions of (1) providing a protective enclosure for the motor-basket assembly and associated parts and (2) retaining the moisture which is thrown from the basket and collecting such moisture for appropriate discharge. In this embodiment then, the motor-basket assembly along with the enclosing housing 23, 24 define an enclosed assembly 21 which is supported by the frame 22. Since the housing performs no supporting function, it may be of very light weight construction. In this embodiment, as best seen in FIGS. 2 and 3, the motor 10 is not provided with the above described plastic envelope; and the housing is provided with transverse baffles 35, 34 between the motor and basket which define a tortuous path for air flowing axially through the assembly, and retain entrained moisture in the defined basket compartment of the housing. For removing this moisture, the lower member 24 is provided with a drain opening 36 and a moisture cup 37 is secured to this member to collect draining moisture. As illustrated in FIG. 2, the member 24 may be provided with embedded magnets 38 surrounding the drain 36, coacting with a cup of magnetic material for example.

The frame 22 may be fabricated from tubular metal for example, and consists of a U-shaped base 40, a hangar arm 41 which includes a generally vertical portion and a horizontal portion spaced above the base 40, and a handle portion 42 formed by a reverse bend in the arm at its upper end and which may carry a suitable hand grip. An integral finger 43 projects downwardly from the arm 41 above the approximate center of the base 40.

The suspension link 44 for the extractor assembly 21 consists of a fitting 45 secured to the motor stud 27 and defining an extension finger, and a length of tubing 46 fabricated from a flexible, elastic material such as rubber and which is rigidly secured at one end to the frame finger 43 and at the other end to the fitting 45. The tubing may be secured to these members in any suitable manner such as by cementing or by means of suitable clamps. Since, as mentioned previously, the motor stud 27 is located at a balance point of the assembly 21, this assembly when suspended in the manner illustrated in FIG. 1 will maintain the illustrated horizontal position.

Figure 4:
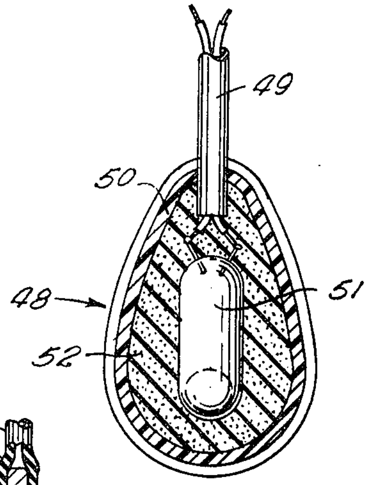
FIG. 4 is a detail view of an external switch unit.

In FIG. 1 there is shown a pendant, gravity operated switch unit 48, suspended from the housing by a two-conductor cord 49; and this switch unit is illustrated in detail in FIG. 4. As seen in FIG. 4 this particular gravity operated unit includes an outer housing 50 of suitable insulating material suitably to the cord 49, an elongated tube 51 containing a globule of mercury with the tubing including a pair of contacts at its upper end connected to the conductors of the cord 49, and a suitable insulating filler material 51 to stabilize the tube within the housing. In the normal pendant position, illustrated in FIGS. 1 and 4, the switch contacts are open; and the operator merely inverts the switch unit 48 to close the contacts to operate the extractor unit. This type of switch unit is practical where the drying operation requires a very short time such as one minute or less; and also represents a safety feature in that the unit automatically turns off when the operator releases the switch unit.

Figure 11:
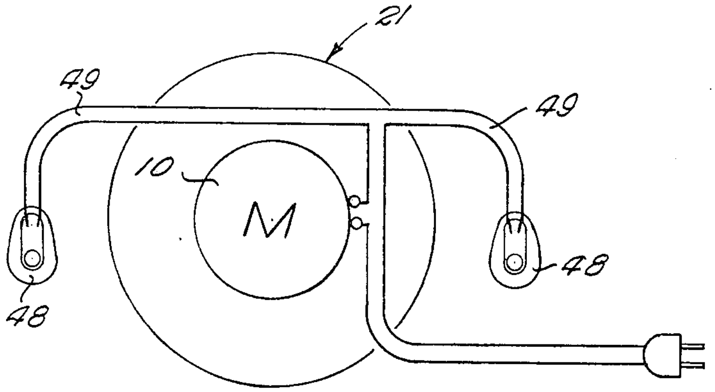
FIG. 11 is a schematic and diagrammatic illustration of an extractor unit, with two switch units connected in series, requiring operation by both hands of an operator.

FIG. 11 illustrates another safety feature involving the use of two such pendant switch units 48 wich are connected in series. In this system two pendant switch units would be suspended from the extractor unit 21 from opposite sides of the unit, such than an operator would be required to use both hands to invert both switch units simultaneously. The switch units are connected in series so that the units may be inverted or closed simultaneously to operate the extractor unit. This of course necessarily maintains the operators hands away from the rotating basket 12.

EMBODIMENT OF FIG. 6

Figure 6:
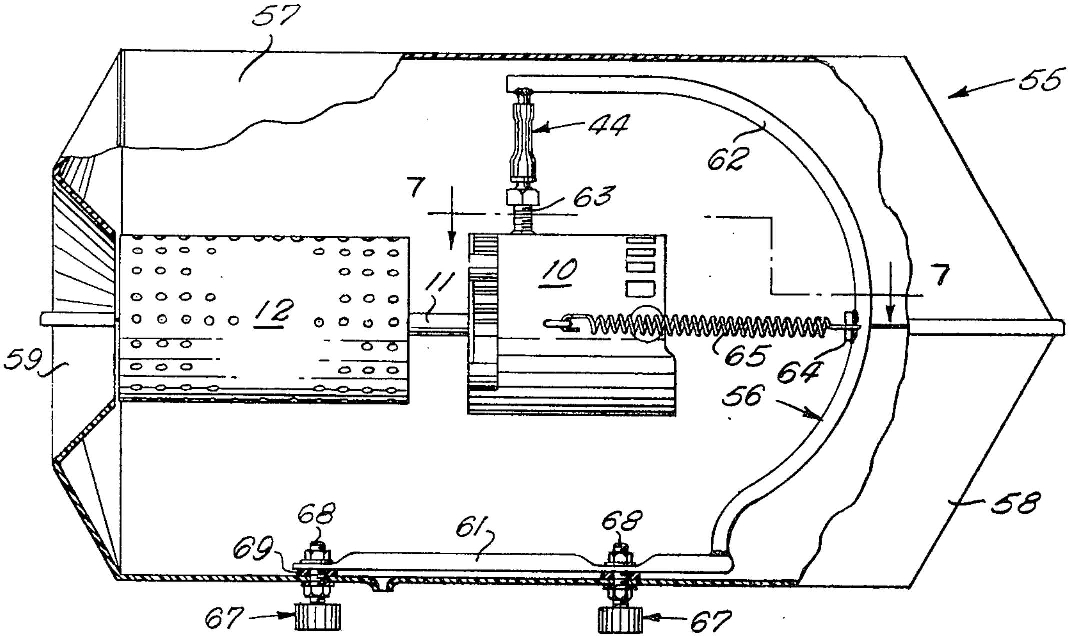
FIG. 6 is a side elevation view of another form of extractor unit according to the invention, with the housing partially broken away.
Figure 7:
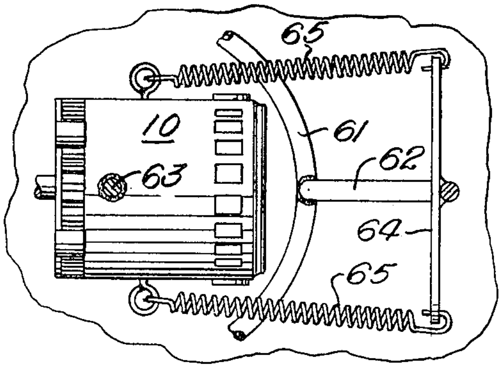
FIG. 7 is a fragmentary top view of structural features of the unit of FIG. 6.

FIG. 6 illustrates another form of centrifugal extractor unit 55 including the above described motor-basket assembly 10, 12, a support frame 56 and an enclosing housing or shell consisting of upper and lower halves 57 and 58. In this unit the housing completely encloses the motor-basket assembly and frame, and provides a loading port 59 at one end for loading and unloading the basket 12.

The frame 56 is somewhat similar to the previously described frame 22, including a U-shaped base 61 and hangar arm 62 projecting upwardly and over the base for supporting the motor-basket assembly by means of the suspension link 44 as previously described. In this unit, a threaded stud 63 is secured to the motor housing at the desired location to support the unit in horizontal orientation as previously described.

Since, in this unit, the basket 12 must be maintained in alignment with the housing loading port 59, it may be desirable to provide additional stabilizing members to prevent rotation of the motor-basket assembly about the suspension link 44. For this purpose the frame hangar arm includes a transverse arm 64; and stabilizing springs 65 are connected between this arm 64 and the sides of the motor housing 10 to maintain the desired alignment of the motor-basket assembly.

The housing 57, 58 is again preferably fabricated from a thin plastic shell of a material such as ABS having sufficient regidity to retain its shape, its function being to retain and collect moisture thrown from the basket and for providing a pleasing appearance of the unit. The lower housing member 58 is secured to the frame base 61 by means of the four foot assemblies 67. These assemblies consist of a bolt 68 with an integrally molded head of resilient material and an adjusting nut, with the bolt extending through the lower housing and through the frame base and secured by suitable nuts. Sealing washers 69 disposed between the frame and the housing prevent leakage of moisture at these foot assemblies. The upper and lower housing membrs are joined together at coacting flanges by means of a suitable cement. The lower housing member is provided with a drain opening for removing moisture from the housing in any suitable manner.

EMBODIMENT OF FIG. 8

Figure 8:
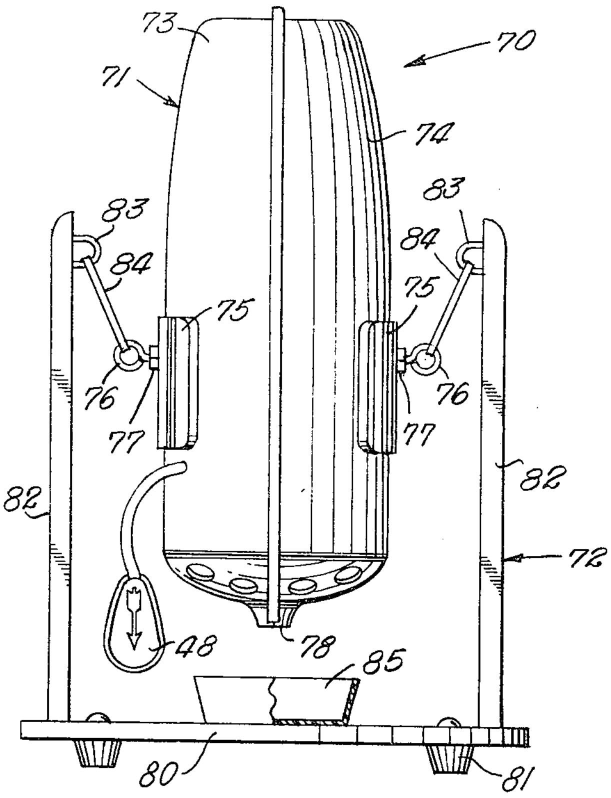
FIG. 8 is an elevation view of still another form of extractor unit supported in a vertical orientation by an exterior frame.

FIG. 8 illustrates another form of centrifugal extractor unit 70 including a housing enclosed motor-basket assembly 71 supported in vertical orientation by an external frame 72. In this unit, the described motor-basket assembly 10, 12 is enclosed in a relatively close fitting housing consisting of housing halves 73 and 74 having a configuration very similar to the housing of FIG. 4.

In this unit the motor housing 10 is provided with a pair of oppositely facing support brackets provided with arcuate bracket plates (similar to the bracket 13 in FIG. 2) for supporting the housing havles 73 and 74. The brackets may be provided with radially aligned threaded bores, with the brackets and bores being located relative to the weight of the assembly to support the assembly in the vertical orientation illustrated. The housing halves are secured to the bracket plates by means of clamping plates 75, with the clamping plates in turn being secured by means of threaded eyes 76 and associated lock nuts 77. The housing halves have coacting flanges at a joining plane, and are secured together by means of a suitable cement. The housing is provided with a drain opening 78 at the lower or motor end.

The frame 72 may consist of a flat disc-like base 80 of suitable material, having secured thereto resilient foot pads 81 for supporting the unit on a horizontal surface, and having a pair of oppositely spaces upright hangar arms 82 provided with eyelets 83 at their upper ends.

The suspension links for this unit are elongated elastic tension members such as bands of straps of rubber 84 connected between the frame eyelets 83 and the motor eyelets 76. The base 80 may include means for supporting a water collection vessel 85 disposed beneath the drain opening 78.

EMBODIMENT OF FIG. 9

Figure 9:
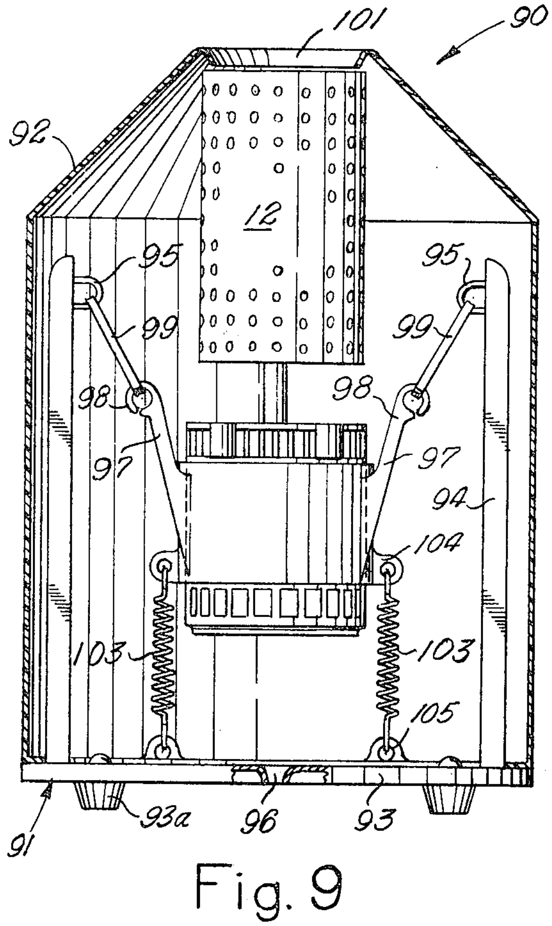
FIG. 9 is a sectional view, in a vertical plane, of yet another form of extractor unit supported in vertical orientation by an interior frame.

FIG. 9 illustrates another form of centrifugal extractor unit 90, wherein a motor-basket assembly 10, 12 is supported on vertical orientation on a frame 91, with the assembly and frame being enclosed in a housing or shell 92. In this unit the frame 91 is generally similar to the frame 72 of FIG. 8, and also forms the base for the enclosing housing. The frame consists of a disk-like base 93 of suitable material having attached resilient foot pads 93*a*, and a pair of upwardly extending hangar arms 94 having eyelets 95 at their upper ends. The frame base is preferably slightly dished or otherwise controured to direct moisture toward a central drain opening 96.

For supporting the motor-backet assembly in vertical orientation, the motor housing is provided with bracket arms 97 on opposite sides which extend upwardly and terminate in eyelets 98. This assembly is then supported by means of suspension link straps 99, in the manner of the FIG. 8 embodiment, with the eyelets 98 being disposed well above the center of mass of the motor-basket assembly so that the assembly will normally suspend itself in the desired vertical orientation.

The housing 92, for this motor-basket assembly and frame, is an upright generally cylindrical shell having an open bottom which seats on and is secured to the frame base 93 in any desired manner, and which is contoured at the top toward a central loading port 101.

In order to stabilize the motor-basket assembly, particularly at the end of an operating cycle (that is to maintain the basket in alignment with the loading port), stabilizing members 103, as shown in the form of tension springs, may be connected between suitable eyelets 104 and 105 formed on the motor 10 and the base 93 respectively.

EMBODIMENT OF FIG. 10

Figure 10:
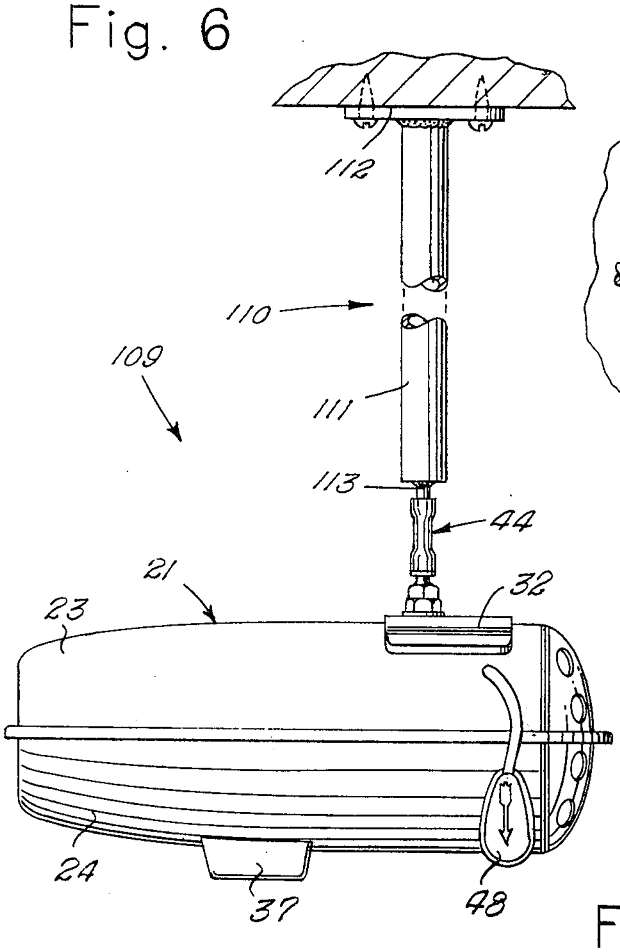
FIG. 10 is an elevation view of still another form of extractor unit, supported in horizontal orientation from a bracket.

FIG. 10 illustrates an extractor unit 109 including the enclosed assembly 21, of FIGS. 1 and 2, suspended from a different form of support frame 110. This illustrates a permanent installation, wherein a centrifugal extractor unit is mounted in a permanent location, which might be the case for a commercial establishment such as a wig cleaning shop or hair dressing shop for example. The support frame has the form of a bracket assembly 110, including an elongated pipe or tube 111 having an attached flange 112 at its upper end for securing the bracket to a ceiling or other overhead structure, and having a fitting 113 secured at its lower end which includes a reduced finger to be received in and secured to the suspension link 44 previously described.

OPERATION in the intended use for the above described units, particularly when drying articles fabricated from synthetic fibers or materials, it is contemplated that the use cycle would be fractions of a minute or a very few minutes. Where the use is for fabrics or articles of natural fibers which cannot be completely dried by centrifuging, the cycle time may be longer to extract as much moisture as possible and minimize the subsequent air drying time.

Particularly for the shorter drying cycles, the described pendent control switch or switches is useful and convenient. The switch is grasped grapsed by the operator and as an additional advantage will require the use of at least one and possibly both hands of the operator. If the operator should need to leave the extractor unit during the cycle, the switch unit is merely dropped or released and the extractor unit will automatically shut off, thereby obviating the possibility that the operator will be distracted from the operation and leave the unit running for an extended period of time. This will protect both the unit and the articles within the basket.

What has been described are a plurality of forms of centrifugal extractor units particularly adapted for the centrifugal drying of relatively small articles made from synthetic fibers or fabrics. All of the units are designed for convenience of use, either in the home or in commercial establishments, and have the features of simple structural design, convenience of use, and very light weight for easy portability.

While preferred embodiments of the invention have been illustrated and described it will be understood by those skilled in the art that changes and modifications may be resorted to without departing from the spirit and scope of the invention.

What is claimed is:

1. In a centifugal extractor a motor-basket assembly comprising an electric drive motor, having a motor housing and a drive shaft projecting from said housing, and an open ended extractor basket rigidly and non-rotatably coupled to said shaft with its open end facing away from said motor;

a support frame for supporting said assembly, including at least one hanger arm;

at least one elastic, flexible suspension link, connected between said frame hanger arm and said motor housing, providing a hanging suspension for said motor-basket assembly;

and a non-supporting housing means mounted on said motor housing, and enclosing said motor-basket assembly; said housing means having a loading port; said assembly and said housing means being disposed, relative to each other, to position the basket open end adjacent to said loading port.

2. A centrifugal extractor as set forth in claim 1 said suspension link comprising a length of tubing of rubber-like material having one end rigidly attached to said hanger arm and having its other end rigidly attached to said motor housing.

3. A centrifugal extractor as set forth in claim 1 sealing means for said motor comprising an envelope fabricated from a moisture proof film material, enclosing said motor housing, and means for securing said envelope to bushing means on said shaft, thereby enabling relative rotation of said shaft; and control means for shutting off said motor in response to a predetermined temperature within said envelope.

4. A centrifugal extractor as set forth in claim 1 control switch means for said extractor comprising a pendant switch unit suspended from said housing means by means of a multi-conductor cord; said switch unit containing gravity operated switch means which maintains the switch open in the pendant position, and closed in an inverted position; and said switch means being connected in a circuit for connecting said motor to a source of electrical energy.

5. A centrifugal extractor as set forth in claim 4 said control switch means comprising first and second pendant switch units as set forth in claim 4; said first and secnd pendant switch units being disposed relative to said means to prevent operation by one hand of the person operating the extractor; and said first named and second pendant switch units being connected in series with each other and with said motor, whereby both pendent switch units must be inverted simultaneously to effect operation of said motor.

6. A centrifugal extractor as set forth in claim 1 said housing means comprising a light weight, thin walled shell.

7. A centrifugal extractor as set forth in claim 1 said housing means comprising a thin walled shell, formed to closely enclose said motor-basket assembly, support bracket means fixed to said motor housing including means for attachment to said suspension link;

and said support bracket means including means for firmly attaching said housing means to said motor-basket assembly.

8. A centrifugal extractor as set forth in claim 7 said support frame comprising a standard having a base and a rigidly attached upwardly extending hanger arm including means for coupling to said suspension link.

9. A centrifugal extractor as set forth in claim 8 said hanger arm having means defining a carrying handle, at its upper end, to enable the manual carrying of the centrifugal extractor.

10. A centrifugal extractor as set forth in claim 7 baffle means comprising panels secured to said housing and defining a transverse partition between said motor and said basket; said panels overlapping each other to provide a tortuous path for air moving through said extractor unit housing.

11. A centrifugal extractor as set forth in claim 7 said motor support bracket means including a contoured plate for supporting a contoured portion of said housing means; a clamping plate configured to overlie said support plate; and means for securing said clamping plate to said support plate, to clamp therebetween a portion of said extractor unit housing means to thereby firmly attach said housing means in fixed relation to said motor housing.

12. A centrifugal extractor unit as set forth in claim 1 means fixed to said support plate and projecting through said clamping plate, defining said means for attachment to said suspension link.

13. A centrifugal extractor as set forth in claim 1 said support frame comprising a bracket assembly adapted to be firmly attached to a building wall structure.

14. A centrifugal extractor as set forth in claim 1 said at least one elastic, flexible suspension link providing the sole suspension for the weight of said motor-basket assembly.

15. In a centrifugal extractor a motor-basket assembly comprising an electric drive motor, having a motor housing and a drive shaft projecting from said housing, and an open ended extractor basket rigidly and non-rotatably coupled to said shaft with its open end facing away from said motor;

a support frame for supporting said assembly, including a base and at least one hanger arm;

at least one elastic, flexible suspension link, connected between said frame hanger arm and said motor housing, providing a hanging suspension for said motor-basket assembly;

and a non-supporting housing means mounted on said support frame base, and enclosing said hanger arm and said motor-basket assembly; said housing means having a loading port; said assembly and said housing means being disposed, relative to each other, to position the basket open end adjacent to said loading port.

16. A centrifugal extractor as set forth in claim 15 said housing means comprising a thin walled shell formed to be firmly attached to said support frame base and to enclose said hanger arm and said suspended motor-basket assembly.

17. A centrifugal extractor as set forth in claim 16 said housing means being fabricated from a plastic material and being sufficiently rigid to be self-supporting.

18. A centrifugal extractor as set forth in claim 17 said housing means comprising first and second housing members; said first member being firmly attached to said frame base portion; and said second member being secured in sealing relation to said first member.

19. A centrifugal extractor as set forth in claim 15 elastic stabilizer means connected between said motor housing and said frame for maintaining the selected orientation of said motor-basket assembly relative to said unit housing.

20. A centrifugal extractor as set forth in claim 15 said at least one elastic, flexible suspension link providing the sole suspension for the weight of said motor-basket assembly.

* * * * *